United States Patent

[11] 3,623,505

| [72] | Inventors | Eugene J. Barsness<br>Broomall, Pa.;<br>Stuart P. Simpson, Tampa, Fla. |
| --- | --- | --- |
| [21] | Appl. No. | 851,550 |
| [22] | Filed | Aug. 20, 1969 |
| [45] | Patented | Nov. 30, 1971 |
| [73] | Assignee | Westinghouse Electric Corporation<br>Pittsburgh, Pa. |

[54] FLOW DISTRIBUTION DEVICE
5 Claims, 5 Drawing Figs.

[52] U.S. Cl................................................. 137/592
[51] Int. Cl............................................... F17c 13/00
[50] Field of Search................................... 137/561,
    592, 561.1; 138/44, 41, 40; 239/553.5, 553.3, 561,
    559, 563

[56] References Cited
UNITED STATES PATENTS

| 1,186,226 | 6/1916 | Parker | 239/553.5 X |
| --- | --- | --- | --- |
| 1,330,174 | 2/1920 | DeCew | 138/44 X |
| 1,642,154 | 9/1927 | Kemp | 239/559 X |
| 1,751,960 | 3/1930 | Veenstra | 239/561 |
| 2,865,830 | 12/1958 | Zoldas | 239/553.3 X |

FOREIGN PATENTS

| 18,745 | 10/1895 | Great Britain | 137/561.1 |
| --- | --- | --- | --- |

Primary Examiner—M. Cary Nelson
Assistant Examiner—Richard Rothman
Attorneys—A. T. Stratton, F. P. Lyle and F. Cristiano ABSTRACT: A duct of axially elongated tubular shape having a plurality of outlet openings in its tubular wall and a series of perforated partitions of varying flow resistance along the length of the duct. The partitions add pressure drop to fluid flow therethrough to counteract the changing fluid momentum in the duct as fluid is bled from the outlet openings, thereby giving uniformly distributed flow through the outlets with lower pressure loss than heretofore.

PATENTED NOV 30 1971 3,623,505

WITNESSES
Robert C. Baird
Helen M. Farkas

INVENTORS
EUGENE J. BARSNESS &
STUART P. SIMPSON
BY

FLOW DISTRIBUTION DEVICE

BACKGROUND OF THE INVENTION

In many heat-exchanger applications, it is desired to bring one of the fluids into the heat exchanger through an inlet pipe and then distribute the flow of fluid uniformly over a large area. A previously proposed arrangement for distribution involves the employment of an axially elongated duct connected to the inlet pipe and having a series of axially and circumferentially spaced outlet openings of uniform cross-sectional area.

With the above arrangement, in order to provide uniformly distributed flow, the pressure drop characteristics of the duct are necessarily unduly large compared to the inlet fluid velocity head to counteract the changing fluid momentum along the length of the duct.

SUMMARY OF THE INVENTION

In accordance with the teachings of the invention, there is provided an improved flow distribution device comprising a tubular duct of axially elongated shape having a plurality of outlet openings.

The duct is preferably closed at one end and open at its opposite end for connection to a pressurized fluid admission supply conduit or pipe.

The duct is provided with a series of internal transverse partitions spaced axially from each other along the length of the duct, and each of the partitions is provided with perforations or openings to impose a varying resistance to flow along the length of the duct.

Preferably, the outlet openings in the duct are uniformly spaced and of uniform cross-sectional area and the perforated partitions have perforations of decreasing total cross-sectional area in the direction of fluid flow through the duct.

The partitions add pressure drop to the fluid flow therepast to counteract the increasing fluid momentum in the duct as fluid is progressively discharged through the outlets. Accordingly, the fluid discharged from the duct is substantially uniformly distributed over the length of the duct. Also, uniform distribution is attained with less pressure loss than heretofore, since the total cross-sectional area of the outlet openings may be increased for any predetermined set of conditions, above the total cross-sectional area of prior devices in which the outlet openings imposed the total pressure drop to the distributed fluid.

DESCRIPTION OF THE PREFERRED EMBODIMENTS

Figure 1:
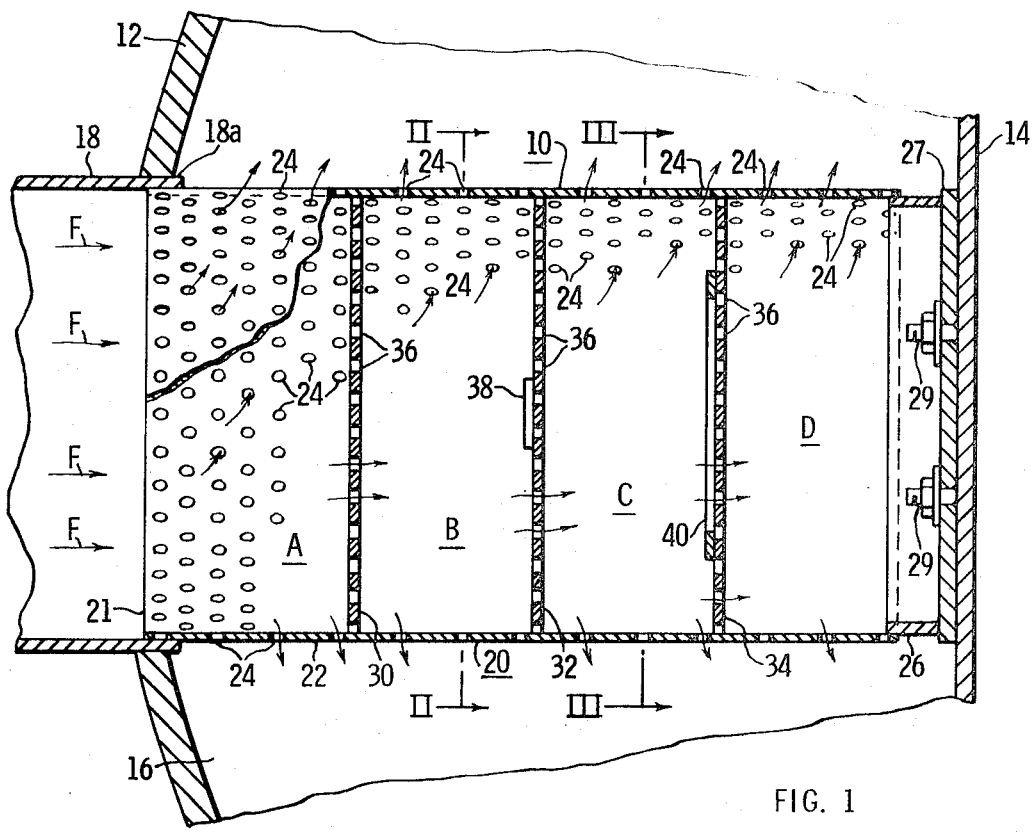
FIG. 1 is an axial sectional view of a fluid-distributing structure formed in accordance with the invention.

Referring to the drawings in detail, in FIG. 1 there is shown a preferred embodiment of a fluid distribution structure 10. The distribution structure 10 is shown in connection with a housing comprising wall structure 12 and 14 at least partially defining a chamber 16 to which pressurized fluid, for example a liquid such as water is admitted from a conduit 18.

The fluid distribution structure 10 comprises a tubular duct portion 20 of axially elongated shape and of a diameter to snugly mate at its open or entrance end 21 with the circular end 18a of the conduit 18. The duct portion 20 has a cylindrical wall portion 22 of rectilinear shape and formed of perforated sheet material having a large number of equally spaced openings or perforations 24 of substantially uniform shape (circular, as illustrated) and size.

The duct portion 20 extends across the chamber towards the wall 14 and is telescopically engaged by a preferably imperforate cylindrical end portion 26 welded or otherwise attached to a disc shaped end closure 27 which is, in turn, secured to the wall 14 by a pair of threaded stud bolts and nuts 29.

A plurality of disc-shaped partitions 30, 32 and 34 are disposed within the duct portion 20 each partition traversing the entire cross-sectional opening of the duct and being in closely fitting relation with the cylindrical wall 22 in an equiaxially spaced relation with each other. The end partition 34 is also spaced equidistantly from the adjacent end of the end closure member 26, and, in a similar manner, the end portion 30 is also spaced equidistantly from the adjacent end 18a of the conduit 18. Accordingly, the partitions divide the duct wall 22 into four equal length annular portions A, B, C and D, and each of the annular portions therefore have substantially an equal number of perforations or outlet openings 24 and their respective total outlet open areas are substantially equal.

The partitions 30, 32 and 34 are also preferably formed of perforated sheet material having openings or perforations 36 of equal size, shape and spacing. However, the partition 32 has an imperforate disc plate 38 attached thereto in a central position (see FIGS. 1 and 2) so that a number of its perforations are blocked. In a similar manner, the partition 34 has a ring-shaped plate 40 attached thereto in a central position (see FIGS. 1 and 3) so that a number of its perforations are also blocked.

The ring-shaped plate 40 is of larger surface area than the disc plate 38 and hence is effective to block a greater number of perforations. Accordingly, the partition 30 has the greatest total open perforation area, the partition 32 has a smaller total open perforation area and the partition 34 has the smallest total open perforation area.

In operation, as pressurized fluid such as water or the like is admitted to the fluid distribution device 10 by the conduit 18, as indicated by the arrows F, the fluid flow is distributed substantially uniformly into the chamber 16 through the outlet openings 24 of each of the annular portions A, B, C and D. That is, each annular portion A, B, C and D is effective to admit the fluid at a substantially equal mass flow rate into the chamber 16. This phenomenon is effected by the perforated partitions 30, 32 and 34. The partitions are of increasing flow-resistance characteristics in the direction of fluid flow, hence they are effective to add pressure drop to the fluid in a manner to counteract the changing fluid momentum in the distribution housing 12 as fluid is bled from the outlets 24.

Figure 4:
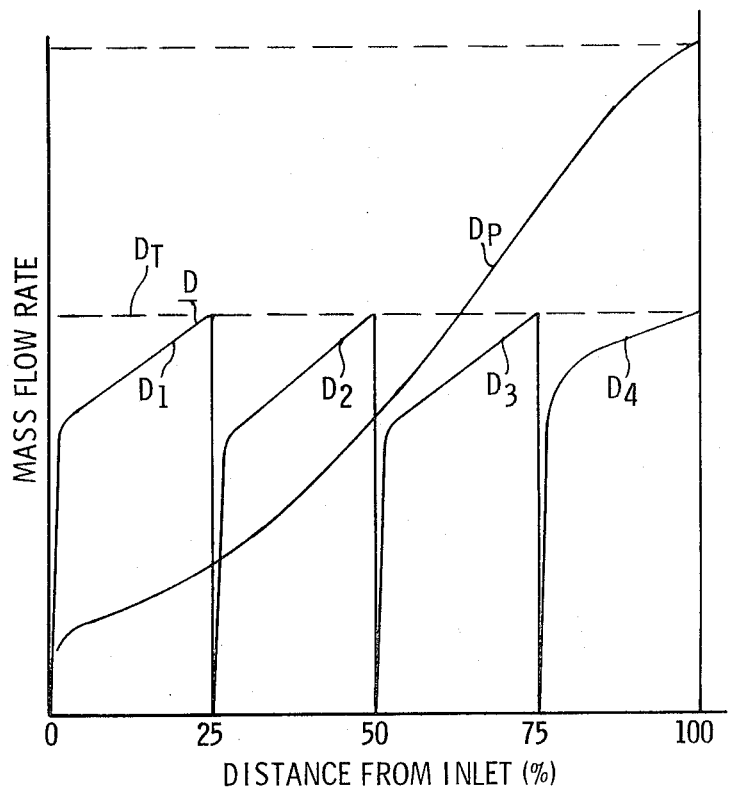
FIG. 4 is a graph comparing the flow characteristics of the above fluid distributing structure and the prior art.

The above scheme of operation is graphically illustrated by the curve D in the chart shown in FIG. 4, wherein the ordinate indicates mass flow rate of the fluid, i.e. fluid weight per unit of time per unit of flow area of the distribution device and the abscissa indicates axial distance from the inlet of the distribution device as a percentage of its total axial length.

In this chart, on the abscissa, "0" indicates the inlet portion 21, "25 percent" indicates the axial position of the first partition 30, "50 percent" indicates the axial position of the second partition 32, "75 percent" indicates the axial position of the third partition 34, and "100 percent" indicates the right end portion of the cylindrical wall 22. The curve D is divided into four equal portions $D_1$, $D_2$, $D_3$ and $D_4$, illustrating the flow distribution through the outlet openings 24 of the respective annular portions A, B, C and D. It will be observed that the curve portions $D_1$, $D_2$, $D_3$ and $D_4$ are substantially of similar shape and height and generally impart a sawtooth form to the curve D. It will also be observed that by increasing the number of partitions the sawtooth shape of the curve D may be smoothed out, i.e. made to approach the theoretical optimal limit of uniform distribution indicated by the dotted horizontal straight line curve $D_T$.

For comparison purposes, there has been superimposed on the same chart, a curve $D_p$ illustrating the nonuniform distribution of fluid attained with a prior art device (not shown) comprising a distribution duct having a plurality of outlet openings but lacking the perforated partitions of applicants' inventive contribution. It will be noted that the curve $D_p$ depicts a condition in which the mass flow rate of the distributed fluid progressively increases at a rapid rate with increase in distance from the inlet. This undesirable effect is attained due to the changing (increasing) fluid momentum as fluid is bled from the outlet openings of the prior art device.

Figure 2:
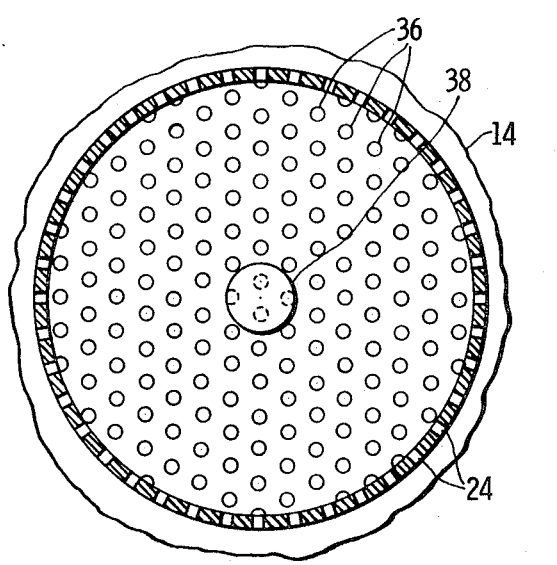
FIGS. 2 and 3 are transverse sectional views taken along lines II—II and III—III, respectively, of FIG. 1.
Figure 3:
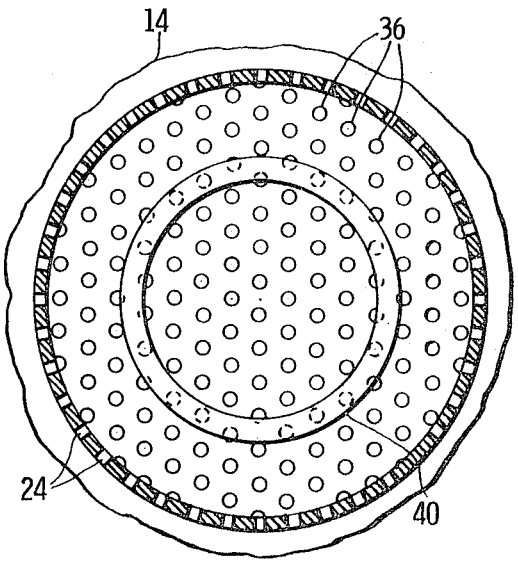

Referring to FIGS. 2 and 3, it will be noted that the disc 38 acts in a manner similar to the ring member 40, i.e. to block the desired number of apertures 36 in the respective partitions 32 and 34. It must be pointed out that the disc 38 and/or the ring member 40 may be obviated if desired and the required pressure drop characteristics of the partitions 32 and 34 may be obtained by changing the spacing between the apertures and/or the cross-sectional area of the apertures in the respective partitions 32 and 34.

Figure 5:
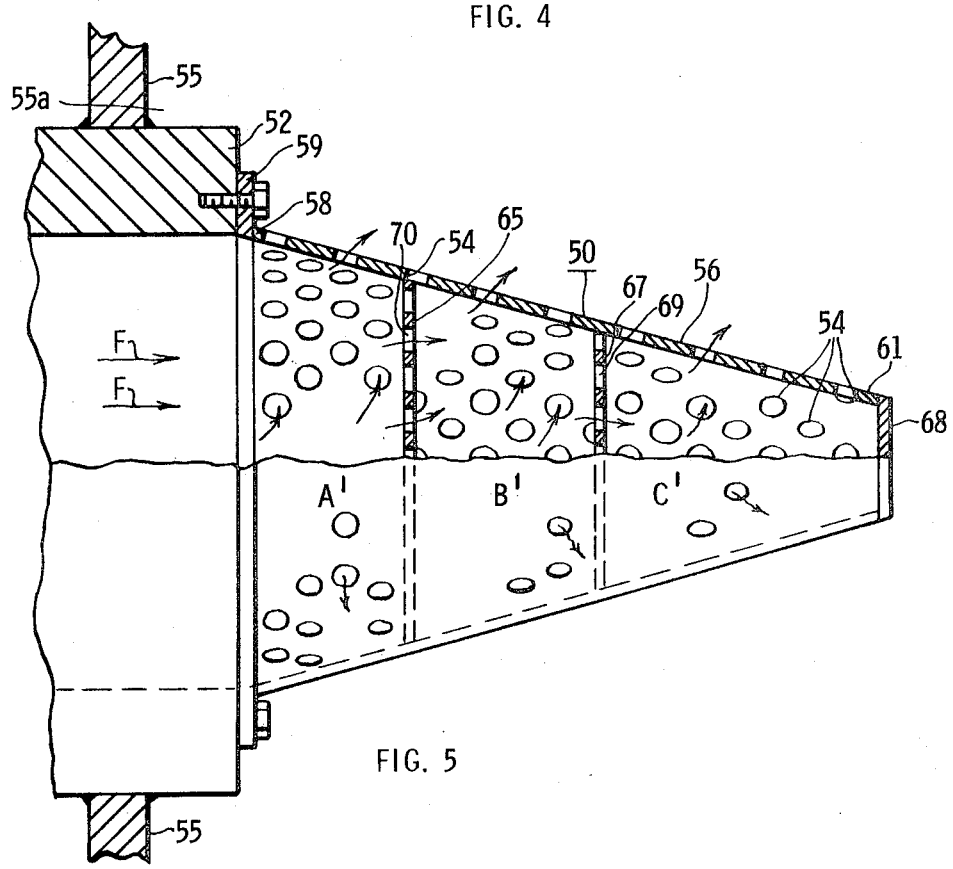
FIG. 5 is an axial sectional view of a second embodiment of the invention.

In FIG. 5 there is shown a flow distribution device 50 forming a second embodiment of the invention. This device, in a manner similar to the first embodiment, is employed to distribute pressurized fluid admitted thereto by a conduit 52, as indicated by the arrows F through a plurality of outlets 54 into a chamber 55a defined partly by a wall structure 55. In this embodiment, the fluid outlet apertures 54 are provided in a duct 56 of rectilinear frustoconical shape with its large diameter end portion 58 forming the fluid inlet and connected to the conduit 52 by an annular flange 59. The conduit 52 extends through a suitable opening in the wall 55 and is secured to the latter in any suitable manner.

In this embodiment, the structure is supported at only one end (the inlet end 58) in cantilever fashion. Accordingly the downstream end portion 61 is closed by a preferably imperforate end closure disc member 63 welded or otherwise attached thereto. Also, in this example a plurality of perforated partitions 65 and 67 are disposed in axially spaced parallel relation with each other and with the inlet and downstream end portions 58 and 61, respectively. However due to the convergent cross-sectional area of the fluid flow path through the frustoconical duct 56, the total cross-sectional area of the apertures 69 in the partition 67 is less than the total cross-sectional area of the apertures 70 in the partition 65, even though they are of equally spaced and of equal size and shape. Hence, the blocking member 38 and/or 40 of FIG. 1 are not required.

Also (in view of the convergent flow path within the duct 56) the axial spacing between the inlet 58 and the partition 65, the partitions 65 and 67, and the partition 67 and the end closure 68, are respectively of increasing dimension to define frustoconical fluid distribution portions A', B' and C' of substantially similar mass flow distribution characteristics.

Although several embodiments of the invention have been shown and described, it will be obvious to those skilled in the art that it is not so limited, but is susceptible of various changes and modifications without departing from the spirit thereof.

We Claim:

1. A fluid distributing structure comprising
   a tubular walled axially elongated duct structure open at least at one end, the duct having a uniform cross section throughout its length and being of rectilinear shape,
   means for admitting a pressurized fluid into said one end of said duct,
   the duct being formed from perforated sheet material to provide a plurality of outlet openings distributed axially as well as girth wise along the wall of the duct, and generally distributed over the entire wall surface for discharging fluid from said duct, and
   means for effecting uniform flow through said outlet openings comprising a plurality of perforated sheet material partitions, each partition traversing the entire cross-sectional opening of the duct and being disposed transversely within said duct.

2. The structure recited in claim 1, wherein
   the outlet openings are of substantially uniform cross-sectional area, and
   the partitions are uniformly spaced from each other along the longitudinal axis of the duct.

3. The structure recited in claim 1, wherein
   the outlet openings are of substantially uniform cross-sectional area and are uniformly distributed with respect to each other, and
   the partitions are arranged in a manner to impose increasing pressure drop to the fluid flow therethrough.

4. The structure recited in claim 3, wherein each partition is provided with a greater perforation cross-sectional area than its neighboring downstream partition taken in the direction of fluid flow therepast.

5. The structure recited in claim 1, wherein
   each partition has generally the same number of perforations, and plates having various surface areas are fastened to the partitions to provide greater open perforation area in adjacent partitions in upstream direction.

* * * * *